(12) United States Patent
Frantz et al.

(10) Patent No.: US 12,281,581 B1
(45) Date of Patent: Apr. 22, 2025

(54) MODULE FOR AN AIRCRAFT TURBINE ENGINE

(71) Applicant: SAFRAN AIRCRAFT ENGINES, Paris (FR)

(72) Inventors: Caroline Marie Frantz, Moissy-Cramayel (FR); Bastien Pierre Verdier, Moissy-Cramayel (FR); Jean Charles Olivier Roda, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/695,477

(22) PCT Filed: Sep. 26, 2022

(86) PCT No.: PCT/FR2022/051800
§ 371 (c)(1),
(2) Date: Mar. 26, 2024

(87) PCT Pub. No.: WO2023/052713
PCT Pub. Date: Jun. 4, 2023

(30) Foreign Application Priority Data

Sep. 29, 2021 (FR) ..................................... 2110275

(51) Int. Cl.
*F01D 15/10* (2006.01)
*F01D 7/00* (2006.01)
(Continued)

(52) U.S. Cl.
CPC .............. *F01D 15/10* (2013.01); *F01D 7/00* (2013.01); *F02C 7/36* (2013.01); *F04D 25/0693* (2013.01);
(Continued)

(58) Field of Classification Search
CPC ... F01D 15/10; F01D 7/00; F02C 7/36; F04D 25/0693; F05D 2220/323; F05D 2220/76; F05D 2240/30; F05D 2260/40311
See application file for complete search history.

(56) References Cited

U.S. PATENT DOCUMENTS 6,767,187 B2   7/2004  Franchet et al.
7,291,953 B1 * 11/2007  Smith .................... H02K 41/03
                                                310/191
(Continued)

FOREIGN PATENT DOCUMENTS

EP    2048329 A1 *  4/2009  ............. F01D 15/10
FR    3087232 A1     4/2020
(Continued)

OTHER PUBLICATIONS

International Search Report mailed Jan. 2, 2023, issued in corresponding International Application No. PCT/FR2022/051800, filed Sep. 26, 2022, 5 pages.

(Continued)

*Primary Examiner* — Brian Christopher Delrue
(74) *Attorney, Agent, or Firm* — CHRISTENSEN O'CONNOR JOHNSON KINDNESS PLLC (57) ABSTRACT

A module including a device for changing the pitch of the vanes about the pitch axes thereof, the device including a hydraulic actuator capable of rotating about the longitudinal axis and configured to rotate the vanes about their pitch axes, a pump for supplying fluid to the hydraulic actuator, including a transmission shaft and a placed around the transmission shaft and rotating as one with the drive shaft, and an electric machine including a rotor rotating as one with the transmission shaft and a stator rotationally fixed relative to the longitudinal axis. The stator can be connected to a power (Continued)

supply cable passing through a passage provided in the third element of the speed reducing gear.

10 Claims, 6 Drawing Sheets

(51) Int. Cl.
*F02C 7/36* (2006.01)
*F04D 25/06* (2006.01)

(52) U.S. Cl.
CPC .... *F05D 2220/323* (2013.01); *F05D 2220/76* (2013.01); *F05D 2240/30* (2013.01); *F05D 2260/40311* (2013.01)

(56) References Cited

U.S. PATENT DOCUMENTS

| | | | | |
|---|---|---|---|---|
| 10,897,182 | B1* | 1/2021 | Merrett | H02K 21/22 |
| 2007/0115163 | A1* | 5/2007 | Brittingham | H01Q 3/46 |
| | | | | 342/13 |
| 2008/0075593 | A1* | 3/2008 | Read | F01D 25/02 |
| | | | | 415/177 |
| 2010/0150707 | A1* | 6/2010 | Jevons | F01D 9/041 |
| | | | | 29/889.22 |
| 2010/0314885 | A1* | 12/2010 | Presz, Jr. | F03D 1/04 |
| | | | | 290/55 |
| 2012/0301290 | A1* | 11/2012 | Justak | F03D 9/00 |
| | | | | 415/208.2 |
| 2018/0354631 | A1* | 12/2018 | Adibhatla | F02C 9/42 |
| 2019/0145269 | A1* | 5/2019 | Campbell | F01D 5/282 |
| | | | | 416/223 R |
| 2020/0224547 | A1* | 7/2020 | Chong | H02K 21/14 |
| 2021/0381388 | A1 | 12/2021 | Tajan et al. | |
| 2021/0396244 | A1 | 12/2021 | Charier et al. | |
| 2022/0393548 | A1* | 12/2022 | Puttichaem | H02K 1/278 |
| 2023/0303263 | A1* | 9/2023 | Schenk | H02K 7/14 |
| 2023/0303264 | A1* | 9/2023 | Schenk | F02K 7/10 |
| 2023/0312128 | A1* | 10/2023 | Schenk | B64D 41/007 |
| | | | | 244/58 |
| 2023/0313739 | A1* | 10/2023 | Becoulet | F02C 7/32 |
| | | | | 184/6.11 |
| 2023/0358148 | A1* | 11/2023 | Schenk | H02K 7/1823 |

FOREIGN PATENT DOCUMENTS

| | | | | |
|---|---|---|---|---|
| WO | WO-2019197144 A1 * | 10/2019 | | F01D 15/10 |
| WO | 2020/074839 A1 | 4/2020 | | |

OTHER PUBLICATIONS

Written Opinion mailed Jan. 2, 2023, issued in corresponding International Application No. PCT/FR2022/051800, filed Sep. 26, 2022, 8 pages.

* cited by examiner

FIG. 6b ical power source located in a stationary location on the turbine engine. The electrical transformer comprises a portion fixed in rotation around the longitudinal axis and is connected to an power supply cable secured to a stationary portion of the turbine engine, and a portion movable in rotation around the longitudinal axis. This configuration is not entirely satisfactory. The routing of the power supply cable poses problems. The power supply cable must pass through rotating and stationary elements of the module and of the turbine engine. In order not to block the power supply and to facilitate the integration of the cable, the rotary transformer is arranged at the level of a bearing support, which tends to increase the axial and radial overall dimension of the module.

MODULE FOR AN AIRCRAFT TURBINE ENGINE

CROSS-REFERENCE TO RELATED APPLICATIONS

This application is a National Stage of International Application No. PCT/FR2022/051800, filed Sep. 26, 2022, which claims priority to French Patent Application No. 2110275, filed Sep. 29, 2021, the entire disclosures of which are hereby incorporated by reference in their entirety for all purposes.

TECHNICAL FIELD OF THE INVENTION

The invention relates to the field of the modules for the aircraft turbine engines. The invention relates more particularly to the modules comprising a hub movable in rotation and variable pitch vanes carried by the hub, such as the fan or propeller modules.

TECHNICAL BACKGROUND

The prior art is illustrated by the documents U.S. Pat. No. 6,767,187 B2 and WO-A1-2020/074839.

An aircraft turbine engine generally comprises a module extending around a longitudinal axis and having a hub movable in rotation around the longitudinal axis and on which vanes are mounted. The module is typically connected to a gas generator. The gas generator comprises, for example, from upstream to downstream, a low-pressure compressor, a high-pressure compressor, a combustion chamber, a high-pressure turbine, a low-pressure turbine and a gas exhaust nozzle. The rotor of the high-pressure compressor is connected to the rotor of the high-pressure turbine by a high-pressure shaft and the rotor of the low-pressure compressor is connected to rotor of the low-pressure turbine by a low-pressure shaft. The low-pressure shaft is also connected to a drive shaft of the hub of the module to drive it in rotation.

The module is, for example, a fan or a propeller. In the case of a fan, the vanes are surrounded by an external casing attached to a nacelle of the aircraft. In the case of a propeller, the fan vanes are mounted outside the nacelle and are therefore not surrounded by an external casing.

In order to optimise the operation of the module and ensure its operability according to the phases of flight of the aircraft, in particular by maintaining a sufficient pumping margin, it is known to modify the orientation of the vanes during the flight of the aircraft. To this end, the vanes are movable about a pitch axis that extends perpendicular to the longitudinal axis. The vanes are referred to as variable pitch or variable pitch vanes. For example, the variable pitch vanes can occupy a reverse thrust position, in which they generate counter-thrust to help slow down the aircraft, and a feathered position, in which, in the event of failure or breakdown, they limit their resistance.

In order to rotate the vanes about their pitch axes, the module of the turbine engine typically comprises a device for changing the pitch of the vanes arranged inside the hub of the module. The document FR-A1-3 087 232 describes a turbine engine comprising a fan module with a hub that can move about a longitudinal axis and on which variable pitch vanes are mounted. The module comprises a device for changing the pitch of the vanes comprising a hydraulic actuator connected to the vanes, a fluid supply pump for the hydraulic actuator and an electric motor for driving the supply pump. According to this document, the electric motor is connected to the hub, which is movable in rotation about the longitudinal axis. As a result, the device for changing the pitch of the vanes also comprises an electrical transformer for supplying electrical power to the engine from an electrical power source located in a stationary location on the turbine engine. The electrical transformer comprises a portion fixed in rotation around the longitudinal axis and is connected to an power supply cable secured to a stationary portion of the turbine engine, and a portion movable in rotation around the longitudinal axis. This configuration is not entirely satisfactory. The routing of the power supply cable poses problems. The power supply cable must pass through rotating and stationary elements of the module and of the turbine engine. In order not to block the power supply and to facilitate the integration of the cable, the rotary transformer is arranged at the level of a bearing support, which tends to increase the axial and radial overall dimension of the module.

There is therefore a need to provide a turbine engine module for an aircraft, comprising a hub carrying variable pitch vanes, with a reduced axial and radial overall dimension and simplified configuration.

SUMMARY OF THE INVENTION

To this end, the invention proposes a module for an aircraft turbine engine, the module comprising a longitudinal axis and comprising:
 a hub extending around the longitudinal axis and movable in rotation around the longitudinal axis,
 vanes carried by the hub, each of the vanes being movable about a pitch axis extending radially with respect to the longitudinal axis,
 a drive shaft designed to drive in rotation the hub about the longitudinal axis,
 a mechanical speed reducer configured to connect a low-pressure shaft of the turbine engine to the drive shaft, the speed reducer comprising a first element designed to cooperate with the low-pressure shaft, a second element secured in rotation to the drive shaft and a third element fixed in rotation about the longitudinal axis, and
 a device for changing the pitch of the vanes about their pitch axes, the device comprising:
  a hydraulic actuator movable in rotation about the longitudinal axis and is configured to drive the vanes about their pitch axes,
  a pump for supplying fluid to the hydraulic actuator, comprising a transmission shaft and an envelope arranged around the transmission shaft and secured in rotation to the drive shaft, and
  an electric machine comprising a rotor secured in rotation to the transmission shaft and a stator fixed in rotation about the longitudinal axis, the stator being designed to be connected to an power supply cable passing through a passage provided in the third element of the speed reducer.

According to the invention, the mechanical speed reducer has a passage for routing the power supply cable. In this way, the module according to the invention has a simplified configuration.

The invention may comprise one or more of the following characteristics, taken alone or in combination with each other:
 the electric machine comprises an electric motor formed by the rotor and a second stator movable in rotation about the longitudinal axis and an electrical transformer comprising the stator and a second rotor movable in rotation about the longitudinal axis;

the electric machine comprises an electric motor formed by the stator and the rotor;

the rotor and stator are coaxial;

the pump is a fixed or variable displacement pump;

the first element is a sun gear, the second element is a ring gear and the third element is a planet carrier;

the electric machine is arranged axially between the hydraulic actuator and the speed reducer;

a hydraulic accumulator movable in rotation about the longitudinal axis and in fluid communication with the supply pump;

a hydraulic directional valve movable in rotation about the longitudinal axis and comprising an inlet port connected to the accumulator and a first outlet port connected to a first chamber of the hydraulic actuator, and a second outlet port connected to a second chamber of the hydraulic actuator, the directional valve further comprising a member movable between a first position in which the inlet port is in fluid communication with the first outlet port and a second position in which the inlet port is in fluid communication with the second outlet port, the module further comprising an electronic control circuit fixed in rotation about the longitudinal axis and configured to control the displacement of the movable member between the first and second positions.

The invention also relates to a turbine engine for an aircraft comprising a module according to any of the preceding characteristics.

BRIEF DESCRIPTION OF THE FIGURES

Further characteristics and advantages will be apparent from the following description of a non-limiting embodiment of the invention with reference to the appended drawings in which.

DETAILED DESCRIPTION OF THE INVENTION

An aircraft comprises a fuselage and at least two wings extending on either side of the fuselage along the fuselage axis. At least one turbine engine is mounted under each wing. The turbine engine can be a turbojet engine, for example a turbine engine equipped with a ducted fan equipped with variable pitch vanes, referred by the acronym VPF for "Variable Pitch Fan". Alternatively, the turbine engine can be a turboprop engine, for example a turbine engine equipped with a unducted propeller (open rotor, USF for Unducted Single Fan or UDF for Unducted Dual Fan). Of course, the invention is applicable to other types of turbine engine.

Figure 1:
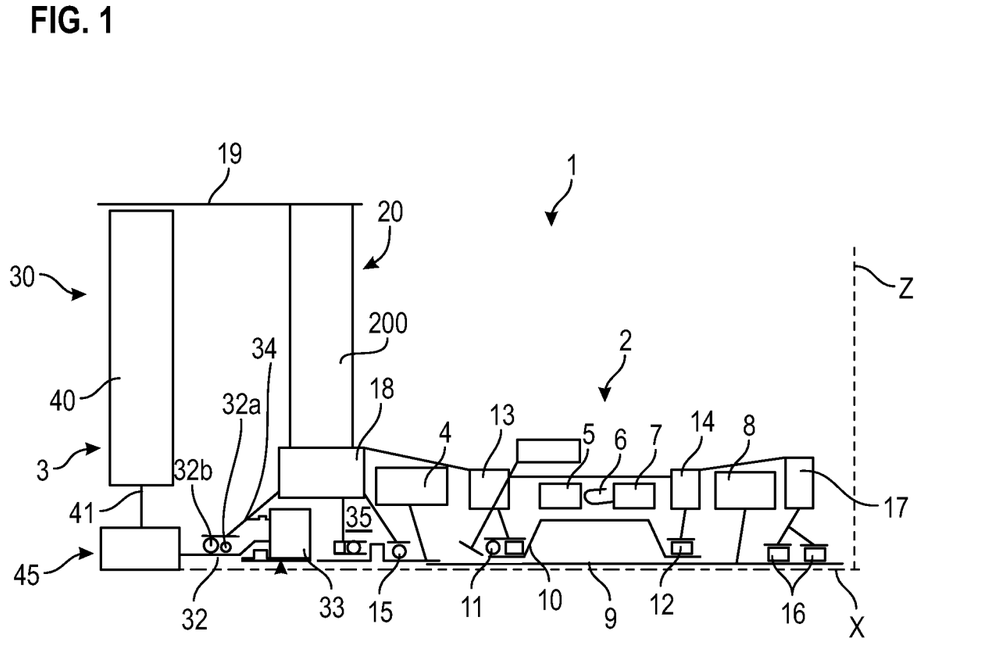
FIG. 1 is a schematic representation of an aircraft turbine engine in axial cross-section.

In the present invention, and in general, the terms "upstream", "downstream", "axial" and "axially" are defined with respect to the circulation of the gases in the turbine engine and here along the longitudinal axis X (and even from left to right in FIG. 1). Similarly, the terms "radial", "radially", "internal", "inner", "external", and "outer" are defined with respect to a radial axis Z perpendicular to the longitudinal axis X and with respect to the distance from the longitudinal axis X.

FIG. 1 shows an example of a turbine engine 1. The turbine engine 1 comprises a gas generator 2 and a module 3 in accordance with the invention. The gas generator 2 comprises, from upstream to downstream, a low-pressure compressor 4, a high-pressure compressor 5, a combustion chamber 6, a high-pressure turbine 7 and a low-pressure turbine 8. The rotors of the low-pressure compressor 4 and of the low-pressure turbine 8 are mechanically connected by a low-pressure shaft 9 so as to form a low-pressure body. The rotors of the high-pressure compressor 5 and of the high-pressure turbine 7 are mechanically connected by a high-pressure shaft 10 so as to form a high-pressure body. The high-pressure shaft 10 extends radially at least partly outside the low-pressure shaft 9. The low-pressure shaft 9 and the high-pressure shaft 10 are coaxial. The high-pressure body is guided in rotation about the longitudinal axis X by a first rolling bearing 11 upstream and a second rolling bearing 12 downstream. The first bearing 11 is mounted between an inter-compressor casing 13 and an upstream end of the high-pressure shaft 10. The inter-compressor casing 13 is arranged axially between the low and high pressure compressors 4, 5. The second bearing 12 is mounted between an inter-turbine casing 14 and a downstream end of the high-pressure shaft 10. The inter-turbine casing 14 is arranged axially between the low and high pressure turbines 8, 7. The low-pressure body is guided in rotation about the longitudinal axis X via a third rolling bearing 15 and a fourth rolling bearing 16. The fourth bearing 16 is a double bearing, for example. The fourth bearing 16 is mounted between an exhaust casing 17 and a downstream end of the low-pressure shaft 9. The exhaust casing 17 is located downstream of the low-pressure turbine 8. The third bearing 15 is mounted between an inlet casing 18 and an upstream end of the low-pressure shaft 9. The inlet casing 18 is located upstream of the low-pressure compressor 4. More specifically, the inlet casing 18 is arranged axially between the module 3 and the low-pressure compressor 4.

In the example shown in FIG. 1, the module 3 is mounted upstream of the gas generator 2. Advantageously, according to this example, a stator vane 20 is arranged axially between the module 3 and the low-pressure compressor 4. The stator vane 20 comprises, for example, vanes 200 mounted on the inlet casing 18. These vanes 200 are referred to as OGV (Outlet Guide Vanes). The stator vane 20 allows to rectify the flow downstream of the module 3 to optimise the operation of the turbine engine 1.

In another embodiment, not shown, the module 3 is mounted downstream of the gas generator 2.

In addition, the module 3 according to the invention comprises vanes 30.

In the example shown in FIG. 1, the vanes 30 are surrounded by an external casing 19. The external casing 19 is attached to a nacelle (not shown) of the aircraft. In this example, the module 2 is a fan module.

In another example not shown, the module 2 is a propeller module. The vanes 30 are not surrounded by an external casing. In this example, the vanes 30 are arranged around the nacelle.

Figure 2:
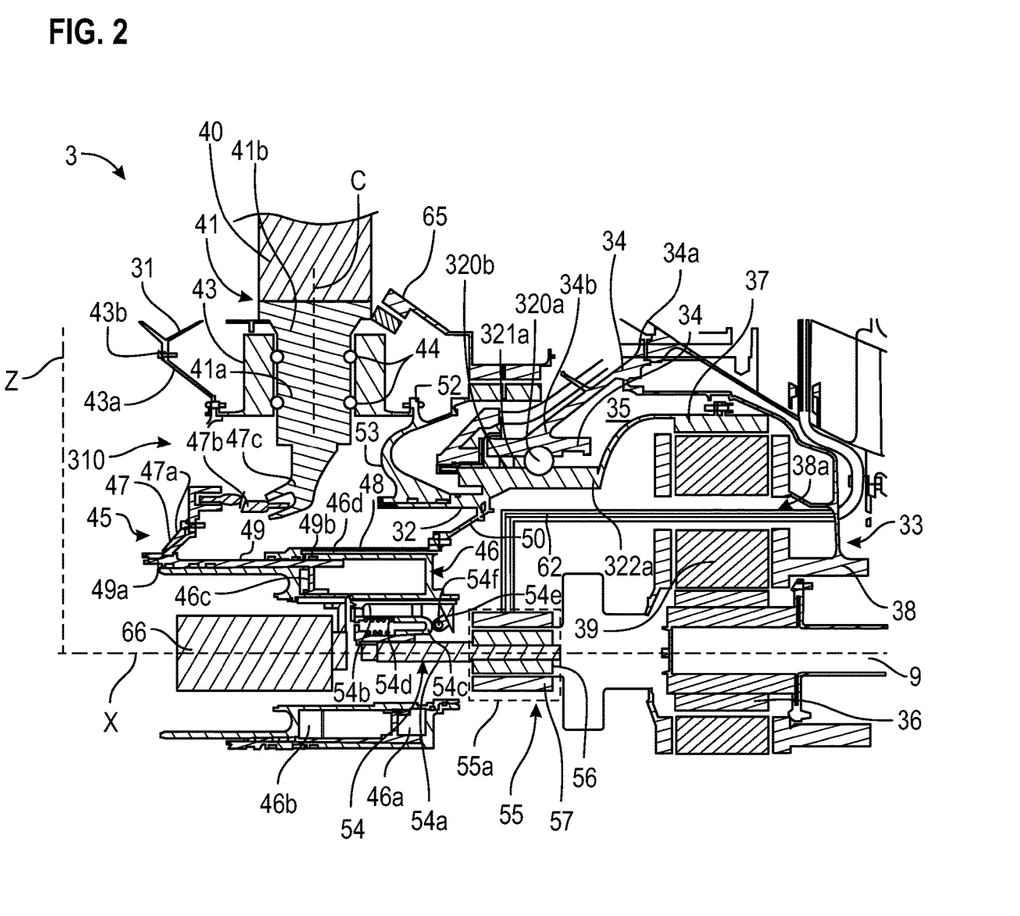
FIG. 2 is an axial sectional view of a module according to a first embodiment of the invention.
Figure 4:
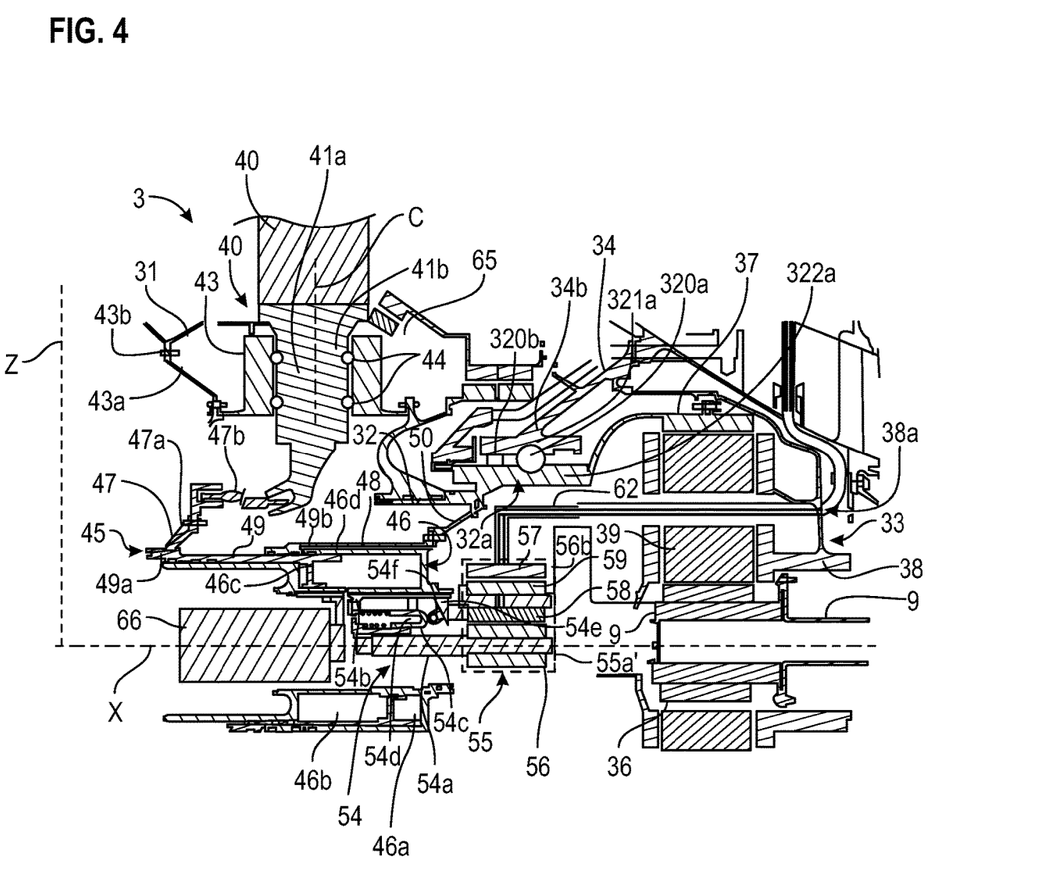
FIG. 4 is an axial sectional view of a module according to a second embodiment of the invention.

As can be seen in FIGS. 2 and 4, the vanes 30 are carried by a hub 43. The hub 43 is annular. It is arranged around the longitudinal axis X.

The vanes 30 are evenly spaced on the hub 43. The vanes 30 extend radially from the hub 43. It comprises an internal space 310. The hub 43 also comprises internal housings evenly distributed around the longitudinal axis X.

The hub 43 is secured to a cone 31 centered on the longitudinal axis X. The cone 31 is arranged upstream of the hub 43. The cone 31 forms an air inlet nozzle for the turbine engine 1. The hub 43 is for example connected to the cone 31 by an attachment arm 43a extending radially with respect to the longitudinal axis X. The attachment arm 43a is connected to the cone 31 and to the hub 43 by an assembly of screws and nuts 43b, for example. The vanes 30 are driven in rotation about the longitudinal axis X. Each vane 30 comprises a root 41 and a blade 40 extending radially outwards from the root 41.

The root 41 comprises a tenon 41b connected to a sleeve 41a. The root 41 is pivotally mounted along a pitch axis C in the internal housing of the hub 43. Advantageously, a root 41 is mounted per internal housing. The sleeve 41a is centered on the pitch axis C. The sleeve 41a is housed in the internal housing of the hub 43.

The pitch axis C is parallel to the radial axis Z and therefore extends radially with respect to the longitudinal axis X. The root 41 is pivotally mounted in the hub 43 by means of two guide bearings 44 mounted in each internal housing and superimposed along the radial axis Z. These bearings 44 are preferably, but not exclusively, ball bearings.

The hub 43 is movable in rotation about the longitudinal axis X. To drive the hub 43 in rotation about the longitudinal axis X and hence the vanes 30, the module 3 comprises a drive shaft 32. The drive shaft 32 is arranged at least partly in the internal space 310. It is centered on the longitudinal axis X. The drive shaft 32 is guided in rotation in the internal space 310 by a first guide bearing 32a and a second guide bearing 32b. The first guide bearing 32a is a ball bearing, for example. The second guide bearing 32b is a roller bearing, for example. The first guide bearing 32a is arranged downstream of the second guide bearing 32b. The first guide bearing 32a comprises balls 320a arranged between an external ring 321a and an internal ring 322a. The second guide bearing 32b comprises rollers 320b arranged between the external ring 321a and the internal ring 322a. The internal ring 322a is secured to the drive shaft 32 and the external ring 321a is carried by a bearing support 34. The bearing support 34 is stationary. It extends radially between an end flange 34a connected to the inlet casing 18 and a base 34b which cooperates with the external ring 321a.

The drive shaft 32 comprises an upstream end to which a trunnion 53 is attached. The trunnion 53 extends radially outwards. The trunnion 53 is connected, for example, by a first flange 52 to the hub 43 to drive it in rotation about the longitudinal axis X.

The drive shaft 32 is driven in rotation by the low-pressure shaft 9, for example. In order to reduce the speed of rotation of the drive shaft 32 relative to the low-pressure shaft 9, the module 3 advantageously comprises a mechanical speed reducer 33. The speed reducer 33 is housed in a lubrication enclosure 35. The lubrication enclosure 35 is, for example, arranged axially between the third bearing 15 and the second guide bearing 32b.

The speed reducer 33 comprises a first element 36 designed to cooperate with the low-pressure shaft 9, a second element 37 secured in rotation to the drive shaft 32 and a third element 38 fixed in rotation. The third element 38 is connected, for example, to a stator of the turbine engine 1, such as the inlet casing 18 or the module 3. The speed reducer 33 also comprises planet gears 39.

The third element 38 has a passage 38a. The passage 38a is a through passage. The passage 38a is elliptical, circular, polygonal or any other shape in cross-section.

The first element 36 is an inner planetary gear, also referred to as a sun gear, which is coupled in rotation with the low-pressure shaft 9, the second element 37 is an outer ring gear coupled in rotation with the drive shaft 32 and the third element 38 is a planet carrier fixed in rotation with respect to the longitudinal axis X. The planet carrier is, for example, secured to the inlet casing 18. In this configuration of the speed reducer 33, the planet gears 39 are carried by the third element 38 and each rotate about an axis substantially parallel to the longitudinal axis X. Each planet gear 39 meshes with the first element 36 and the second element 37. The planet gears 39 are arranged radially between the first element 36 and the second element 37. In this configuration, the first element 36, which is the planetary gear, forms the input of the speed reducer 33, while the second element 37, which is the outer ring gear, forms the output of the speed reducer 33. The speed reducer 33 is a speed reducer 33 with a planetary gear train. The passage 38a is formed in the planet carrier.

Each vane 30 is movable in rotation about the pitch axis C. To this end, according to the invention, the module 3 comprises a device 45 for changing the pitch of the vanes 30 about their pitch axes C. The device 45 is an electrohydraulic device. The device 45 is at least partly arranged in the internal space 310 of the hub 43. This allows to facilitate the maintenance of the device 45 as it is easily accessible. The device 45 is arranged upstream of the speed reducer 33. The device 45 comprises a hydraulic actuator 46 which is movable in rotation about the longitudinal axis X and configured to drive the vanes 30 about their pitch axes C. The actuator 46 is, for example, a hydraulic cylinder. For example, it is arranged in the internal space 310.

The actuator 46 comprises a case 48 and a movable body 49. The movable body 49 is movable in translation in the case 48. The case 48 is secured in rotation to the drive shaft 32. The case 48 is cylindrical, centered on the longitudinal axis X. This configuration allows to limit the overall dimension required by the actuator 46 in the hub 43, both axially and radially. The case 48 comprises a shell 50 which extends radially outwards from an external surface of the case 48 and is attached to the drive shaft 32.

The movable body 49 moves in translation along the longitudinal axis X in the case 48. The case 48 extends radially around the movable body 49. The movable body 49 is in the form of an axial rod extending between a first end 49a and a second end 49b. The actuator 46 also comprises a first chamber 46a and a second chamber 46b. The first and second chambers 46a, 46b are axially delimited by an annular wall 46c arranged in the case 48. The annular wall 46c is secured to the second end 49b of the movable body 49. The movable body 49 moves in translation under the effect of the pressure of a fluid circulating in each chamber 46a, 46b.

The actuator 46 also comprises a pipe 46d. The pipe 46d has an axis parallel to the longitudinal axis X. For example, the pipe 46d is formed in the case 48. The pipe 46d opens into the second chamber 46b.

The device 45 advantageously comprises a connection mechanism 47 secured to the vanes 30 and to the actuator 46. The connection mechanism 47 allows to transform the translational movement of the hydraulic actuator 46 into a rotational movement of the vanes 30. The connection mechanism 47 comprises an annular part 47a, a connecting rod 47b and an eccentric 47c. The annular part 47a is removably attached to the movable body 49 and, for example, to the second end 49a. The annular part 47a comprises a connecting flange which is removably connected to the connecting rod 47b. The connecting rod 47b cooperates with the eccentric 47c which is secured to the vane 30 and in particular connected to the root 41. The annular part 47a thus allows the hydraulic actuator 46 to be dismantled for maintenance operations, for example, without affecting the vanes 30, which remain attached to the connecting rods 47b by means of the eccentric 47c.

In order to drive the movable body 49 in translation so as to drive the vanes 30 about their pitch axes C via the connection mechanism 47, the device 45 according to the invention also comprises a pump 54 for supplying fluid to the actuator 46. The pump 54 is located upstream of the reducer 33. The pump 54 is arranged inside the drive shaft 32. The pump 54 is movable in rotation about the longitudinal axis X.

The pump 54 is a positive displacement hydraulic pump. For example, the pump 54 has a fixed displacement, as shown in FIGS. 2 and 4, or a variable displacement.

The pump 54 comprises a transmission shaft 54a and an envelope 54b arranged around the transmission shaft 54a. The envelope 54b delimits an internal space in which at least one piston 54c with a fluid-receiving chamber 54d is arranged. The piston 54c is connected to a plate 54e by a ball-and-socket joint 54f. For example, the pump 54 has an oscillating plate.

The transmission shaft 54a is centered on the longitudinal axis X. The envelope 54b is secured in rotation to the drive shaft 32. More particularly, the envelope 54b is secured to the actuator 46 for a joint rotation about the longitudinal axis X by the drive shaft 32.

The pump 54 is connected in a fluidic manner to a hydraulic supply circuit C. The hydraulic supply circuit C advantageously comprises a hydraulic accumulator 66. The hydraulic accumulator 66 allows to compensate for the variations in fluid volume due to its compressibility and its expansion. The hydraulic accumulator 66 is in fluid communication with the pump 54. The hydraulic accumulator 66 can be integrated with the pump 54. It is advantageously arranged in the hydraulic actuator 46.

The hydraulic accumulator 66 can thus rotate about the longitudinal axis X. Advantageously, the hydraulic supply circuit C comprises at least one safety valve 660 and at least one non-return valve 661.

As the pump 54 and the hydraulic accumulator 66 can be rotated relative to the longitudinal axis X, the invention allows to dispense with a rotating hydraulic transfer device. In addition, the hydraulic supply circuit C is a closed circuit. It is independent of a hydraulic lubrication circuit of the turbine engine 1 designed, for example, to lubricate the reducer 33. The fluid in the hydraulic supply circuit C supplying the hydraulic actuator 46 is, for example, a hydraulic fluid. The liquid is, for example, pressurised oil or a phosphate ester such as Skydrol. The fluid is thus a fluid circulating in a closed circuit in the hydraulic supply circuit C and is independent of the lubrication circuit of the turbine engine 1. The fluid may therefore be different from the oil used in the lubrication circuit of the turbine engine 1. The fluid can therefore have a lower freezing point or viscosity characteristics that are better suited to the conditions of the turbine engine 1, particularly when the operating temperatures of the turbine engine 1 are low. For example, the fluid in the hydraulic supply circuit C has a freezing point of between −70° C. and −50° C., in particular between −65° C. and −60° C. The fluid pressure in the hydraulic supply circuit C is advantageously greater than 100 bar, preferably greater than 200 bar and even more preferably between 250 bar and 350 bar. As the hydraulic supply circuit C is closed, it is not aerated and it is therefore possible to implement high pressures in the hydraulic circuit. This allows to reduce the overall dimensions of the hydraulic actuator 46.

The hydraulic supply circuit C comprises, for example, a main circuit C1 connecting the pump 54 to the hydraulic actuator 46 and a recovery circuit C2 connecting the hydraulic actuator 46 to the pump 54.

According to the invention, the module 3 also comprises an electric machine 55. The electric machine 55 allows to supply the pump 54 with mechanical energy to ensure its operation when required. The electric machine 55 allows to improve the operability of the device 45. The pump 54 is driven by the electric machine 55 and is therefore independent of the rotation speed of the low pressure shaft 9 or the high pressure shaft 10 which could be used to mechanically draw power to drive the pump 54.

The electric machine 55 is arranged axially between the hydraulic actuator 46 and the speed reducer 33.

The electric machine 55 comprises a rotor 56 which can rotate about the longitudinal axis X. The rotor 56 is secured in rotation to the transmission shaft 54a. The rotor 56 is annular and is arranged around the transmission shaft 54a. The electric machine 55 also comprises a stator 57 which is fixed in rotation about the longitudinal axis X. It is connected, for example, to the planet carrier. The stator 57 is annular and is arranged outside the rotor 56.

Figure 3:
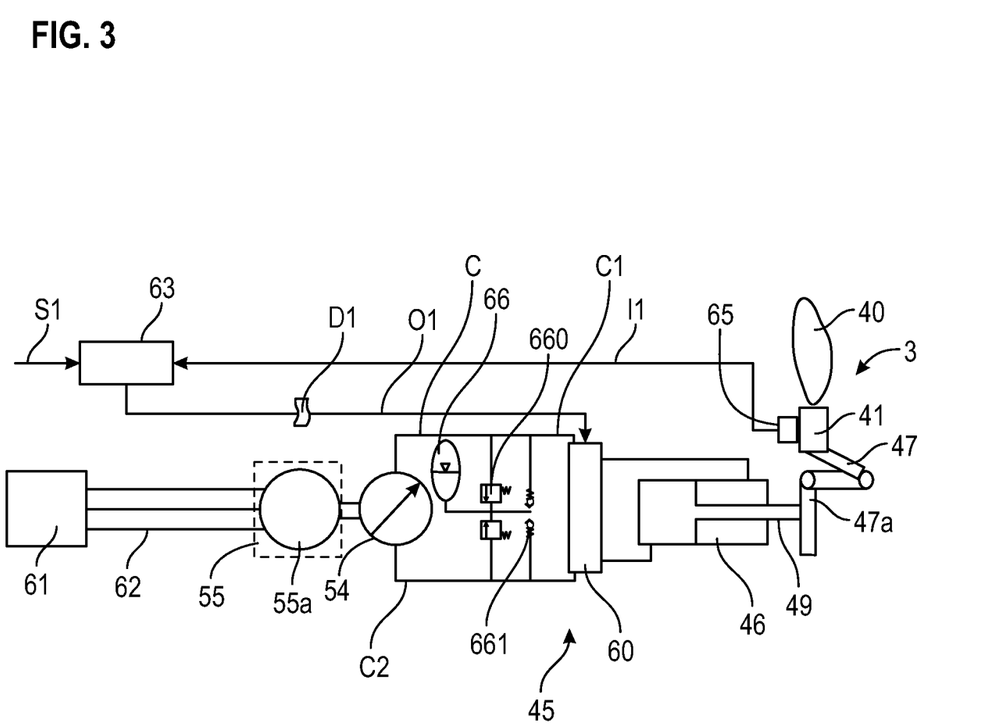
FIG. 3 is a schematic functional representation of the module according to the first embodiment of the invention.

In a first embodiment shown in FIGS. 2 and 3, the electric machine 55 comprises an electric motor 55a. The electric motor 55a is formed by the rotor 56 and the stator 57.

Figure 5:
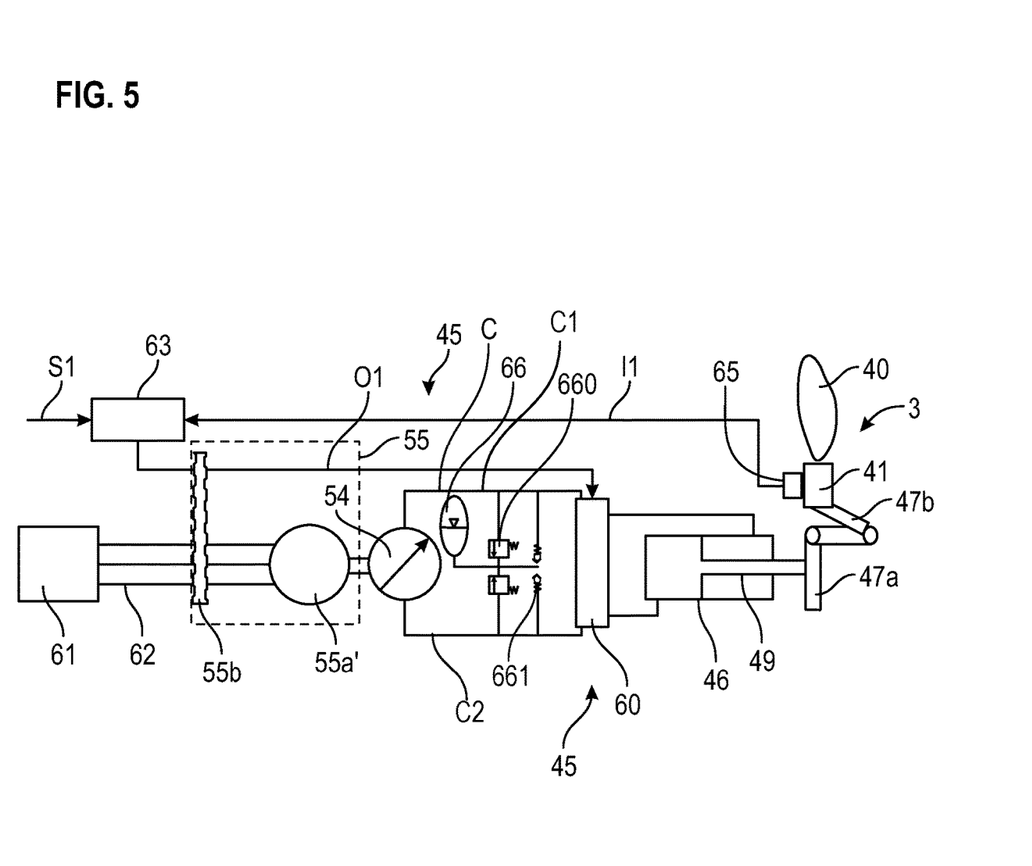
FIG. 5 is a schematic functional representation of the module according to the second embodiment of the invention.

In a second embodiment shown in FIGS. 4 and 5, the electric machine 55 comprises an electric motor 55a' and an electrical transformer 55b. According to this second mode, the electric motor 55a' is movable in rotation about the longitudinal axis X. The electric motor 55a' is arranged coaxially inside the electrical transformer 55b. This configuration allows to reduce the axial overall dimensions of the module 3. The electric motor 55a' is formed by the rotor 56 which is secured in rotation to the transmission shaft 54a and a second stator 58 arranged around the rotor 56. The second stator 58 is movable in rotation about the longitudinal axis X. It is rotationally secured to the envelope 54b, for example.

Figure 6A:
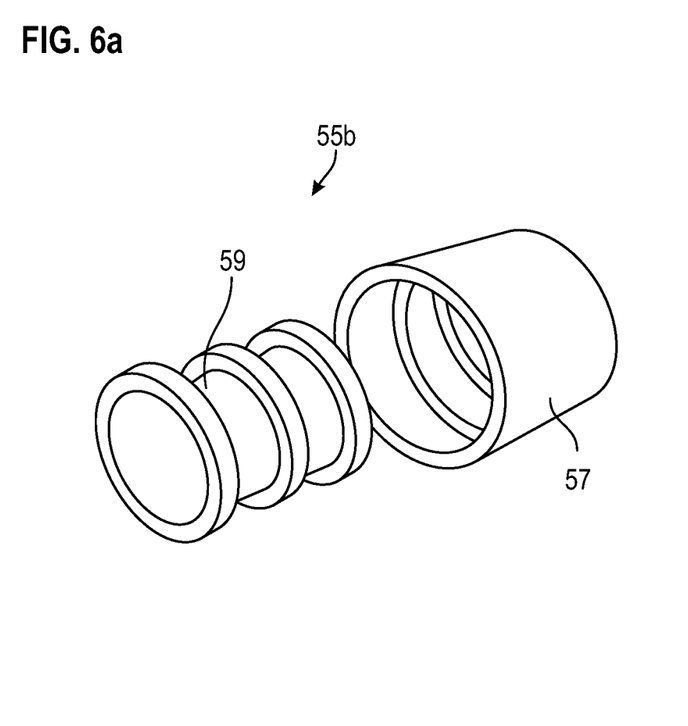
FIG. 6a is a perspective view of a first embodiment of an electrical transformer that can be implemented in the invention.
Figure 6B:
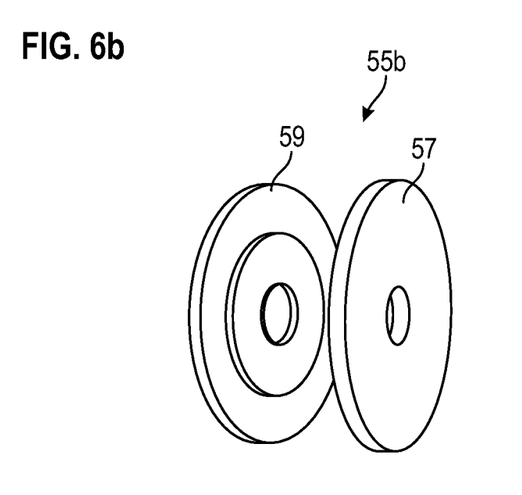
FIG. 6b is a perspective view of a second embodiment of an electrical transformer that can be used in the invention.

The electrical transformer 55b is shown in FIGS. 6a and 6b, for example. The electrical transformer 55b comprises the stator 57 which is fixed in rotation about the longitudinal axis X and a second rotor 59 which is movable in rotation about the longitudinal axis X. The second rotor 59 is secured in rotation to the second stator 58.

In a first embodiment shown in FIG. 6a, the electrical transformer 55b is of the radial type. According to this first embodiment, the second rotor 59 is arranged coaxially inside the stator 57. The second rotor 59 is thus arranged radially between the second stator 58 and the stator 57.

In a second embodiment shown in FIG. 6b, the electrical transformer 55b is of the axial type.

In one example, the electrical transformer 55b also comprises brushes (not shown) for transferring electrical energy from the stator 57 to the second rotor 59. In another example, the transfer of electrical energy from the stator 57 to the second rotor 59 is contactless. The disadvantage of the brushes is that they wear out quickly, reducing the service life of the electrical transformer 55b. A contactless technology therefore allows to ensure the long service life of the electrical transformer 55b.

An electrical power cable 62 is used to supply electrical power to the electric machine 55. The power supply cable 62 is fixed in rotation about the longitudinal axis X. The power supply cable 62 is connected to an electrical network 61 of the turbine engine 1, which is fixed in rotation about the longitudinal axis X. It is thus connected to a stationary portion of the turbine engine 1. The power supply cable 62 is also connected to the stator 57.

In order to facilitate the routing of the power supply cable 62, according to the invention, the latter passes through the passage 38a provided in the third element 38 of the speed reducer 33.

In the first embodiment, the power supply cable 62 is used to supply electrical power to the motor 55a.

In the second embodiment, the power supply cable 62 is used to supply power to the transformer 55b. The transformer 55b then transfers electrical energy to the motor 55a'. The transformer 55b thus allows the electrical energy to be transferred from a stationary reference frame to a rotating reference frame.

Preferably, the module 3 comprises a hydraulic directional valve 60. The hydraulic directional valve 60 is movable in rotation about the longitudinal axis X. The hydraulic directional valve 60 is used to distribute the fluid into the first or the second chamber 46a, 46b of the hydraulic actuator 46 via the pipe 46d, for example. To this end, the hydraulic directional valve 60 comprises an inlet port connected to the hydraulic accumulator 66 via the hydraulic supply circuit C, for example, and a first outlet port connected to the first chamber 46a of the hydraulic actuator 46, and a second outlet port connected to the second chamber 46b of the hydraulic actuator 46. The hydraulic directional valve 60 further comprises a member movable between a first position in which the inlet port is in fluid communication with the first outlet port and a second position in which the inlet port is in fluid communication with the second outlet port.

In order to control the hydraulic directional valve 60, the module 3 also comprises an electronic control circuit 63, which is fixed in rotation about the longitudinal axis. The electronic control circuit 63 is located in the turbine engine 1, for example. The electronic control circuit 63 is, for example, a digital computer such as a FADEC (Full Authority Digital Electronic Computer).

Advantageously, the module 3 comprises a sensor 65. The sensor 65 allows to measure an information 11 which is transmitted to the electronic control circuit 63. The information 11 is, for example, the position of the root 41 of the vane 30 or the movable body 49 of the hydraulic actuator 46.

In a first embodiment shown in FIGS. 2 to 5, the sensor 65 is a position sensor. The position sensor is configured to measure the position of the root 41 of the vane 30. The position sensor works in conjunction with the root 41, for example. The sensor is, for example, an electromagnetic sensor.

In another embodiment not shown, the sensor 65 is, for example, a linear sensor of the LVDT (Linear Variable Differential Transformer) type. The sensor 65 is configured to measure the position of the movable body 49 of the hydraulic actuator 46. For example, it is located in the hydraulic actuator 46.

The sensor 65 supplies the information 11 to the electronic control circuit 63. The electronic control circuit 63 will then supply a command O1 to the hydraulic directional valve 60 which will determine the position of the movable body 46 of the hydraulic actuator 46 in order to modify the pitch of the vanes 30 accordingly.

Since the electronic control circuit 63 is stationary and the hydraulic directional valve 60 can rotate about the longitudinal axis X, in the second embodiment shown in FIG. 5, the command O1 can be transmitted by the electrical transformer 55b of the electric machine 55. In the first embodiment of FIG. 3, in which the electric machine 55 comprises only the electric motor 55a, the transmission of the command O1 can be provided by a signal transfer device D1.

The electronic control circuit 63 also or alternatively receives a signal S1 on the flight conditions of the aircraft and/or the state of the turbine engine 1. The signal S1 is also or alternatively taken into account to supply the command O1 to the hydraulic directional valve 60 which will determine the position of the movable body 46 of the hydraulic actuator 46 in order to modify the pitch of the vanes 30 accordingly.

The invention claimed is:

1. A module for an aircraft turbine engine having a longitudinal axis, the module comprising:
   a hub extending around the longitudinal axis and movable in rotation around the longitudinal axis;
   vanes carried by the hub, each of the vanes being movable about a pitch axis extending radially with respect to the longitudinal axis;
   a drive shaft designed to drive in rotation the hub about the longitudinal axis;
   a mechanical speed reducer configured to connect a low-pressure shaft of the turbine engine to the drive shaft, the speed reducer having a first element designed to cooperate with the low-pressure shaft, a second element secured in rotation to the drive shaft, and a third element fixed in rotation about the longitudinal axis; and
   a device for changing the pitch of the vanes about their pitch axes, the device including:
      a hydraulic actuator movable in rotation about the longitudinal axis and configured to drive the vanes about their pitch axes;
      a pump for supplying fluid to the hydraulic actuator having a transmission shaft and an envelope arranged around the transmission shaft and secured in rotation to the drive shaft; and
      an electric machine having a rotor secured in rotation to the transmission shaft and a stator fixed in rotation about the longitudinal axis, the stator configured to be connected to a power supply cable,
   wherein a passage for the power supply cable is provided in the third element of the speed reducer.

2. The module according to claim 1, wherein the electric machine comprises an electric motor formed by the rotor, a second stator movable in rotation about the longitudinal axis, and an electrical transformer including the stator and a second rotor movable in rotation about the longitudinal axis.

3. The module according to claim 1, wherein the electric machine includes an electric motor formed by the stator and the rotor.

4. The module according to claim 1, wherein the rotor and stator are coaxial.

5. The module according to claim 1, wherein the pump is a fixed or variable displacement pump.

6. The module according to claim 1, wherein the first element is a sun gear, the second element is a ring gear, and the third element is a planet carrier.

7. The module according to claim 1, wherein the electric machine is arranged axially between the hydraulic actuator and the speed reducer.

8. The module according to claim 1, further comprising a hydraulic accumulator movable in rotation about the longitudinal axis and in fluid communication with the supply pump.

9. The module according to claim 8, wherein the module includes a hydraulic directional valve movable in rotation about the longitudinal axis, and includes:
- an inlet port connected to the accumulator,
- a first outlet port connected to a first chamber of the hydraulic actuator, and
- a second outlet port connected to a second chamber of the hydraulic actuator, the directional valve further comprising a member movable between a first position in which the inlet port is in fluid communication with the first outlet port and a second position in which the inlet port is in fluid communication with the second outlet port,
- wherein the module further includes an electronic control circuit fixed in rotation about the longitudinal axis and configured to control the displacement of the movable member between the first and second positions.

10. A turbine engine for an aircraft including a module according to claim 1.

\* \* \* \* \*